United States Patent
Umebayashi et al.

(10) Patent No.: US 7,210,523 B2
(45) Date of Patent: May 1, 2007

(54) VEHICLE AIR CONDITIONER

(75) Inventors: Makoto Umebayashi, Chiryu (JP); Tomohiro Inada, Kariya (JP); Yoshinori Yanagimachi, Takahama (JP)

(73) Assignee: DENSO Corporation, Kariya (JP)

( * ) Notice: Subject to any disclaimer, the term of this patent is extended or adjusted under 35 U.S.C. 154(b) by 492 days.

(21) Appl. No.: 10/797,675

(22) Filed: Mar. 10, 2004

(65) Prior Publication Data

US 2004/0177630 A1    Sep. 16, 2004

(30) Foreign Application Priority Data

Mar. 11, 2003  (JP) .............................. 2003-065724

(51) Int. Cl.
*B60H 1/00* (2006.01)
*B60H 3/00* (2006.01)
*F25B 29/00* (2006.01)

(52) U.S. Cl. ...................... 165/204; 165/230; 62/176.6; 62/133; 236/49.3; 236/44 C; 236/91 C; 454/75; 454/121

(58) Field of Classification Search ................ 165/204, 165/230; 62/176.6, 133; 236/49.3, 44 C, 236/91 C; 454/75, 121
See application file for complete search history.

(56) References Cited

U.S. PATENT DOCUMENTS

| | | | |
|---|---|---|---|
| 4,852,363 A * | 8/1989 | Kampf et al. | 62/176.6 |
| 4,917,293 A * | 4/1990 | Fedter et al. | 236/49.3 |
| 5,931,006 A | 8/1999 | Straub et al. | |
| 5,934,987 A * | 8/1999 | Baruschke et al. | 454/75 |
| 6,155,061 A * | 12/2000 | Davis et al. | 62/176.6 |
| 6,189,325 B1 * | 2/2001 | Pittion et al. | 62/176.3 |
| 6,311,505 B1 * | 11/2001 | Takano et al. | 62/159 |
| 6,625,995 B2 * | 9/2003 | Remond et al. | 62/133 |
| 6,640,566 B2 * | 11/2003 | Mardberg et al. | 62/156 |
| 6,679,075 B2 * | 1/2004 | Kampf et al. | 62/176.6 |
| 7,055,336 B2 * | 6/2006 | Menager et al. | 62/176.6 |
| 7,102,501 B2 * | 9/2006 | Lo Presti et al. | 165/204 |

FOREIGN PATENT DOCUMENTS

| | | | |
|---|---|---|---|
| JP | 62-096130 | | 5/1987 |
| JP | 01297318 A | * | 11/1989 |
| JP | 04-368255 | | 12/1992 |
| JP | 06024239 A | * | 2/1994 |
| JP | 09-109651 | | 4/1997 |
| JP | 10-044763 | | 2/1998 |
| JP | 10-119729 | | 5/1998 |
| JP | 2002-120545 | | 4/2002 |

OTHER PUBLICATIONS

Office Action dated Nov. 7, 2006 in Japanese Application No. 2003-065724 with English translation.

* cited by examiner

*Primary Examiner*—John K. Ford
(74) *Attorney, Agent, or Firm*—Harness, Dickey & Pierce, PLC (57) ABSTRACT

A vehicle air conditioner has an air conditioning unit and an air conditioning control unit. The air conditioning unit has a FACE blowout port, a DEF blowout port, an upper blowout port. The air conditioning control unit estimates an outside windshield temperature and determines an outside dew point temperature. The control unit also controls the upper blowout port to stop blowing or not based on the estimated outside windshield temperature and the outside dew point temperature in a face mode to prevent the windshield from fogging.

9 Claims, 8 Drawing Sheets

VEHICLE AIR CONDITIONER

CROSS REFERENCE TO RELATED APPLICATIONS

This application is based on Japanese Patent Application No. 2003-65724 filed on Mar. 11, 2003, the contents of which are incorporated herein by reference.

BACKGROUND OF THE INVENTION

1. Field of the Invention

The present invention relates to a vehicle air conditioner that prevents a windshield from fogging as appropriate and maintains comfortable feelings of a driver and a passenger.

2. Description of Related Art

In a vehicle air conditioner, some techniques are used for preventing a windshield from fogging. U.S. Pat. No. 5,931,006 discloses one example. In the U.S. patent, when a blowout air temperature toward the windshield at a defroster (DEF) blowout port is lower than a dew point temperature of the outside air, air blowing toward the windshield is stopped to prevent an outside of the windshield from fogging in a cooling mode.

However, the blowout air temperature at a defroster blowout port is usually lower than a windshield temperature in the cooling mode. Accordingly, in the example, it is determined more than necessary that the windshield fogging occurs because the windshield fogging is determined based on a comparison between the blowout air temperature and the dew point temperature. As a result, air blowing toward the windshield may be stopped well before the windshield fogs, and air volume may be decreased more than necessary.

JP-A-2002-120545 discloses another example. In this disclosure, when a capability for dehumidifying and preventing a fogging is low, air blowing from the DEF blowout port is increased or air temperature is increased to prevent an inside of the windshield from fogging in a heating mode.

However, in the later example, air volume blowing from a FOOT blowout port is decreased because a part of warm air is used for blowing from the DEF blowout port to warm the windshield. As a result, heating power may be decreased as a whole.

SUMMARY OF THE INVENTION

An object of the present invention is to provide a vehicle air conditioner that prevents a windshield from fogging as appropriate and maintains comfortable feelings of a driver and a passenger.

According to one aspect of the present invention, the vehicle air conditioner has an air conditioning unit, a control unit, an outside dew point temperature determination means, and an outside windshield temperature estimate means. The air conditioning unit blows conditioned air through blowout ports. The blowout ports have a face blowout port and a top blowout port. The outside dew point temperature determination means determines an outside dew point temperature of outside air. The outside windshield temperature estimate means estimates an outside windshield temperature. The control unit controls the air volume of the conditioned air blown from the face blowout port and the top blowout port based on the outside dew point temperature and the estimated outside windshield temperature in the face blowout port mode.

That is, the control unit uses the estimated outside windshield temperature, not a blowout air temperature, to control the air volume from the top blowout port. Thus, the vehicle air conditioner can prevent the windshield from fogging as appropriate.

Preferably, the top blowout port may have defroster blowout port and an upper blowout port. The upper blowout port is disposed between the face blowout port and the defroster blowout port. The upper blowout port blows the conditioned air toward an inside of the windshield, thereby reflecting the air toward the driver. That is, the conditioned air is blown indirectly toward the driver. The vehicle air conditioner may be configured to blow the conditioned air from the upper blowout port during the face blowout port mode and the cooling mode. In this configuration, the vehicle air conditioner blows the conditioned air from the upper blowout port, so that the windshield can be prevented from fogging and the draft feeling can be prevented as appropriate.

According to another aspect of the present invention, the vehicle air conditioner has an air conditioning unit, a control unit, an inside dew point temperature determination means, and an inside windshield temperature estimate means. The air conditioning unit blows conditioned air through blowout ports. The blowout ports have a foot blowout port and a top blowout port. The inside dew point temperature determination means determines an inside dew point temperature of inside air. The inside windshield temperature estimate means estimates an inside windshield temperature. The control unit controls the air volume of the conditioned air blown from the foot blowout port and the top blowout port based on the inside dew point temperature and the estimated inside windshield temperature in the foot blowout port mode.

That is, the control unit uses the estimated inside windshield temperature, not a blowout air temperature, to control the air volume from the top blowout port. Thus, the vehicle air conditioner can prevent the windshield from fogging as appropriate. Furthermore, frequency of blowing from the top blowout port can be appropriately controlled, thereby the air volume from the foot blowout port can be increased. Therefore, the vehicle air conditioner can prevent the windshield from fogging and improve a conformability.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

The preferred embodiments of the present invention will be explained with reference to the accompanying drawings. In the drawing, the same numerals are used for the same components and devices.

[First Embodiment]

Figure 1:
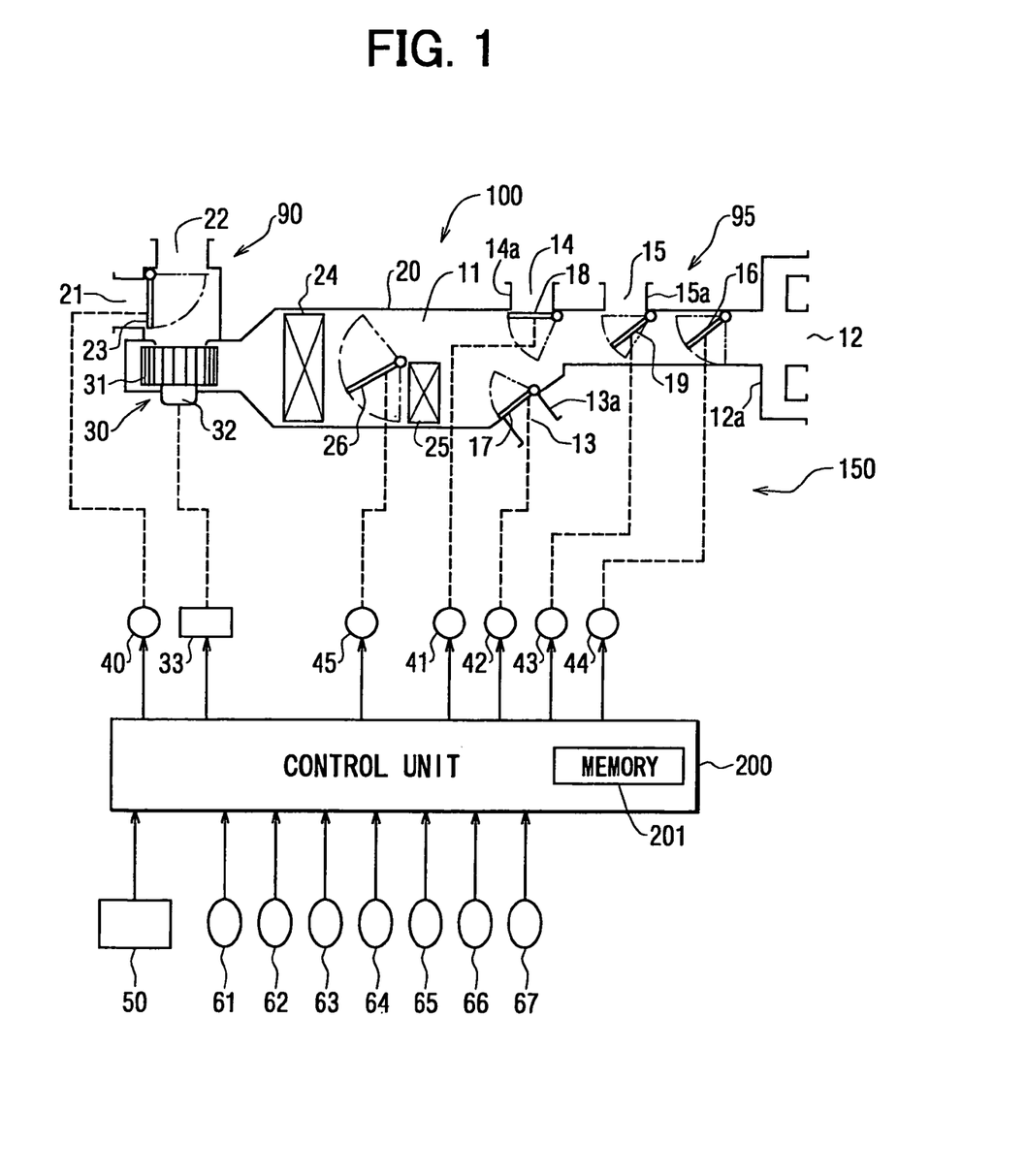
FIG. 1 is a block diagram showing the whole structure of a vehicle air conditioner according to a first embodiment of the present invention.

FIG. 1 shows the whole structure of a vehicle air conditioner 150 according to an embodiment of the present invention. The vehicle air conditioner 150 automatically controls the temperature of a vehicle compartment 4 to keep it at a certain temperature set by a driver. The vehicle air conditioner 150 has an air conditioning unit 100 and an air conditioning control unit 200. The air conditioning unit 100 is used for conditioning the air in the compartment 4. The air conditioning control unit 200 controls each device of the air conditioning unit 100.

Figure 2A:
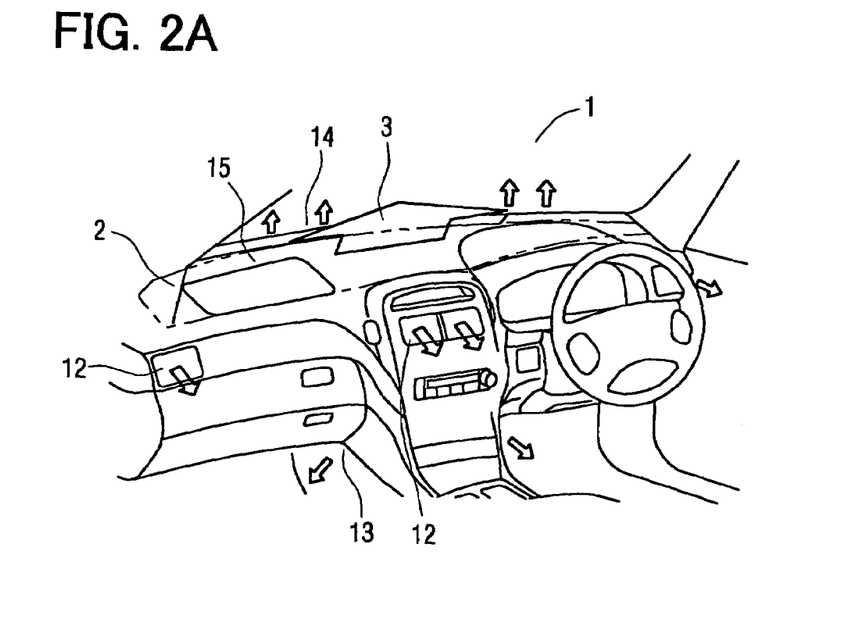
FIGS. 2A, 2B show blowout ports and respective directions of blowout air according to the first embodiment.
Figure 2B:
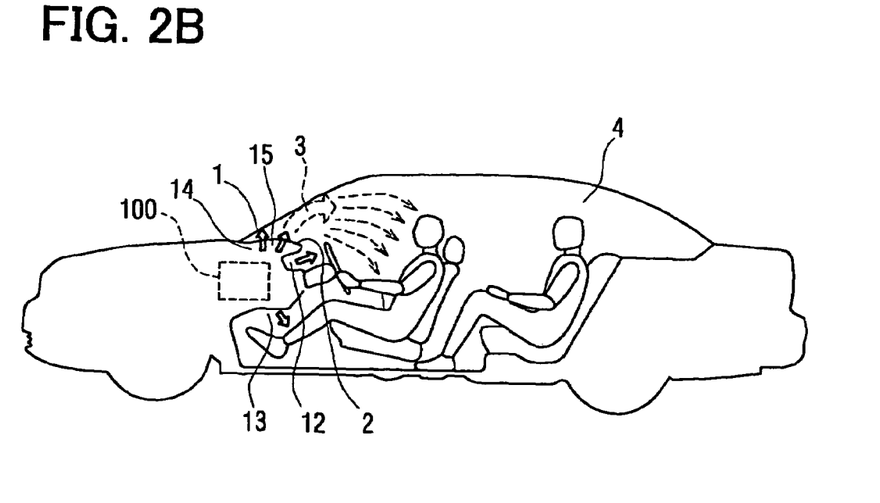

As shown in FIG. 2B, the air conditioning unit 100 is disposed below a backside of an instrument panel 2. The air conditioning unit 100 includes an air conditioning duct 20, which forms an air passage 11 that supplies the conditioned air to the vehicle compartment 4. An inside/outside air switching box 90 is disposed in an upstream end portion of the air conditioning duct 20. The inside/outside air switching box 90 has an inside air suction port 21 and an external air suction port 22. An inside/outside air switching door 23 is rotatably installed inside the suction ports 21, 22 in the box 90. The inside/outside air switching door 23 is driven by an actuator 40, such as a servomotor, to change suction modes from among an inside air circulation mode, an inside and outside air intake mode, and an outside air intake mode.

A centrifugal blower unit 30, for supplying the air through the duct 20, is disposed at a downstream side of the box 90 in the air conditioning duct 20. The blower unit 30 includes a centrifugal fan 31 and a blower motor 32. The centrifugal fan 31 is rotatably housed in a scroll case that is integrated with the air conditioning duct 20. The blower motor 32 rotatably drives the centrifugal fan 31. A rotational speed of the centrifugal fan 31 is controlled by the voltage applied to the blower motor 32 through a blower drive circuit 33. An air quantity, such as suction air and blowout air, is controlled by the rotational speed of the centrifugal fan 31.

An evaporator 24 is disposed downstream of the blower unit 30. The evaporator 24 is a part of a refrigerating cycle. The evaporator 24 dehumidifies and cools the air flowing through the air conditioning duct 20 by exchanging heat between the air and coolant. A heater core 25, through which engine cooling water flows, is disposed downstream of the evaporator 24 in the air conditioning duct 20. The heater core 25 heats the air, which is dehumidified and cooled by the evaporator 24, by exchanging heat between the air and engine cooling water. An air mix door 26 is rotatably installed upstream of the heater core 25. The air mix door 26 is driven by an actuator 45, such as a servomotor. The air mix door 26 adjusts a ratio between the quantity of air flowing through the heater core 25 and the quantity of air bypassing the heater core 25 to produce a certain conditioned air. As a result, the temperature of conditioned air flowing toward the vehicle compartment 4 is adjusted.

A blowout port switching box 95 is disposed at the downstream end of the air conditioning duct 20. The blowout port switching box 95 has a FACE opening portion, a FOOT opening portion, a DEF opening portion, and an upper opening portion. The upper opening portion is directed toward the top of the instrument panel 2. The FACE opening portion, the FOOT opening portion, the DEF opening portion, and the upper opening portion are connected to a FACE duct 12a, a FOOT duct 13a, a DEF duct 14a, and an upper duct 15a, respectively.

Figure 9A:
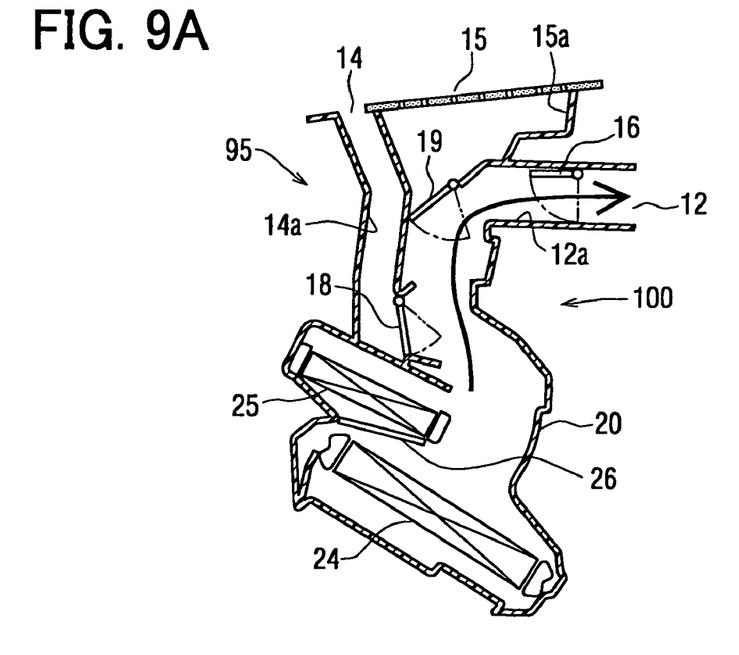
FIGS. 9A, 9B show detailed structures of a air conditioning unit with operated situations in response to the control of FIG. 7 according to the first embodiment.

As shown in FIGS. 1 and 9A, FACE blowout ports 12, a FOOT blowout port 13, a DEF blowout port 14, and an upper blowout port 15 are provided at each downstream end of the FACE duct 12a, the FOOT duct 13a, the DEF duct 14a, and the upper duct 15a, respectively. The FACE blowout ports 12 have a center FACE blowout port and a side FACE blowout port. The FACE blowout ports 12 blow the conditioned air directly toward the upper half of the body of a driver and a passenger. The FOOT blowout port 13 blows the conditioned air toward the feet of the driver and the passenger. The DEF blowout port 14 blows the conditioned air toward a bottom of an inner surface of a windshield 1 to reduce fog from inner and outer surfaces of the windshield 1. The upper blowout port 15 blows conditioned air toward an inner surface of the windshield 1 from an upper surface of the instrument panel 2 between the FACE blowout port 12 and the DEF blowout port 14, thereby reflecting the conditioned air toward the driver and the passenger. That is, the conditioned air from the upper blowout port is blown indirectly toward the driver.

As shown in FIGS. 2A, 2B, 9A, and 9B, the upper blowout port 15 has a lot of small holes that are provided on a certain area within a whole upper surface of the resinous instrument panel 2 (shown in a chain double-dashed line in FIG. 2A), which includes driver and passenger sides. The certain area is an inclined upper surface of the instrument panel 2 at a certain degree toward the driver and the passenger. The conditioned air 3 is blown indirectly toward the driver and the passenger by gradually changing its direction because of an inclination of the inner surface of the windshield 1. As a result, the driver and the passenger can feel that the conditioned air is soft without draft feeling. The draft feeling is caused by blowing the conditioned air directly toward the driver and the passenger.

Blowout port switching doors 16 to 19 are rotatably installed inside the blowout ports 12 to 15, respectively. The switching doors 16 to 19 are driven by actuators 41 to 44, such as servomotors, to separately control whether each blowout port 12 to 15 blows the conditioned air or not, and blowout air volume from each blowout port 12 to 15. In other words, the blowout port switching doors 16 to 19 are provided to change a blowout port mode.

The blowout port mode has a FACE mode, a bi-level (B/L) mode, a FOOT mode, a foot/defroster (F/D) mode, and a DEF mode. The blowout port switching doors 16 to 19 are controlled based on instructions from the air conditioning control unit 200 to change the blowout port mode.

The upper blowout port 15 is mainly used with the face blowout port 12 in the FACE mode. The upper blowout port 15 is also used with the FOOT blowout port 13 and the DEF blowout port 14 in other modes, such as the DEF mode and the FOOT mode, to prevent the windshield 1 from fogging.

The air conditioning control unit 200 has a microcomputer, an input/output circuit, and a memory 201. The microcomputer has a central processing unit (CPU), a read only memory (ROM), a random access memory (RAM), and so on. The memory 201 has the ROM or an electrically programmable read-only memory. The memory 201 stores different kinds of data such as table data for controlling various things and table the temperatures of the cooling water flowing through the engine, and so on.

The inside air humidity sensor 64 and the inside air temperature sensor 61 are installed to detect the common inside air. The outside air humidity sensor 65 is installed inside the external air suction port 22 of the inside/outside air switching box 90.

The input/output circuit performs wave-shaping operation on the sensor signals from the sensors 61 to 67. An analog signal is converted to a digital signal if necessary.

Figure 3:
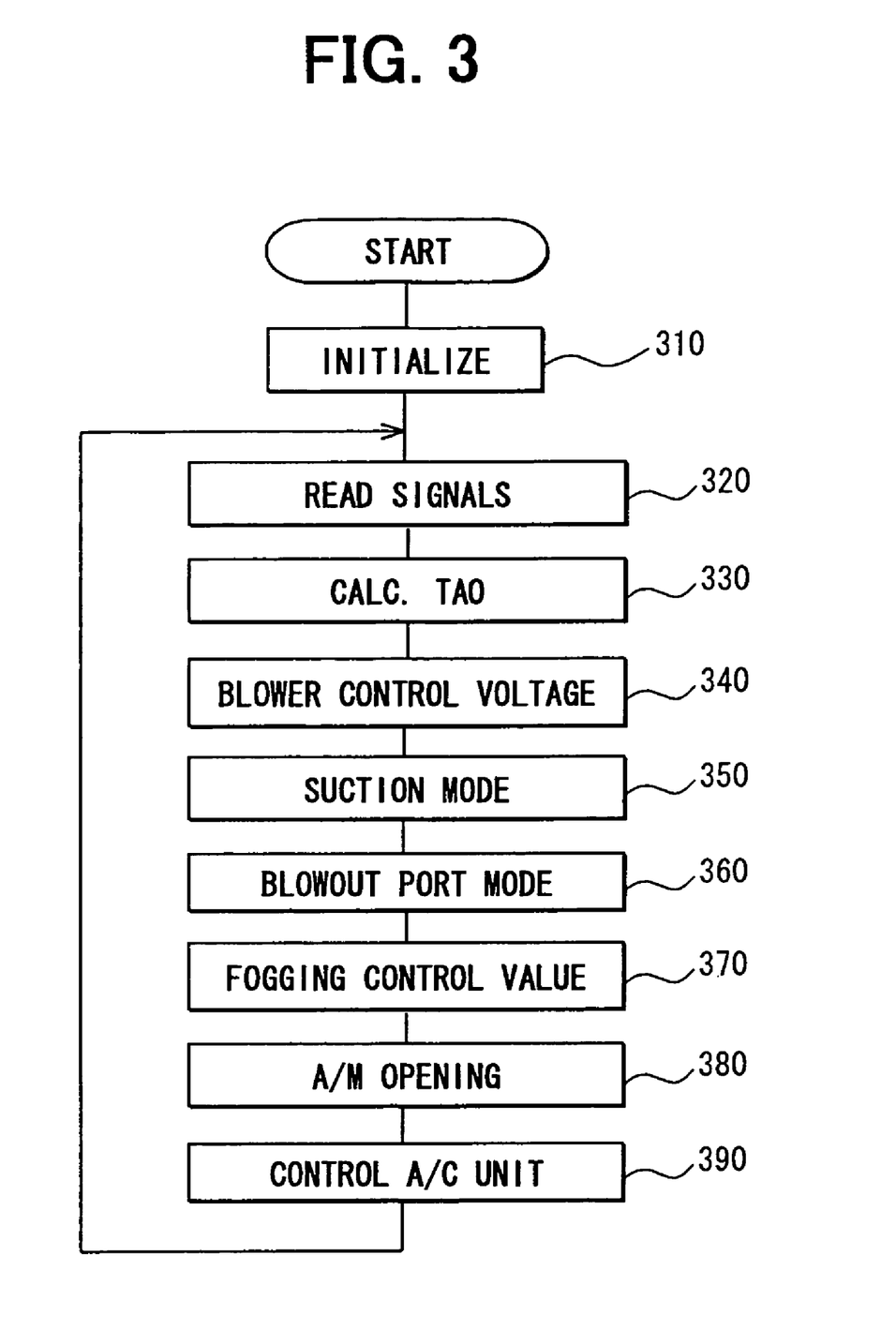
FIG. 3 is a flowchart showing a main procedure of an air conditioning control unit according to the first embodiment.

Next, the operation of the vehicle air conditioner 150 by the air conditioning control unit 200 will be explained with reference to FIG. 3. FIG. 3 shows a main routine of the air conditioning control process carried out by the air conditioning control unit 200.

When the ignition switch of the vehicle is turned on, the routine is started. Contents stored in the memory (RAM) for the data processing are initialized in a first step 310. Then, the signals are read from the control panel 50 and sensors 61–67 in step 320.

In step 330, the air conditioning control unit 200 calculates a target blowout temperature (TAO) based on the signals in response to heat load of the vehicle by using the following equation (1).

$$TAO = KSET \cdot TSET - KR \cdot TR - KAM \cdot TAM - KS \cdot TS + CO \quad (1)$$

In the equation, "TSET" is the set temperature, "TS" is the quantity of solar radiation detected by the solar radiation sensor 63, "TR" is the inside temperature detected by the inside air temperature sensor 61, and "TAM" is the outside temperature detected by the outside air temperature sensor 62. "KSET", "KR", "KAM", "KS" are a temperature setting gain, an inside air temperature gain, an outside air temperature gain, and a solar radiation quantity gain, respectively. "C" is a correction constant.

Figure 4:
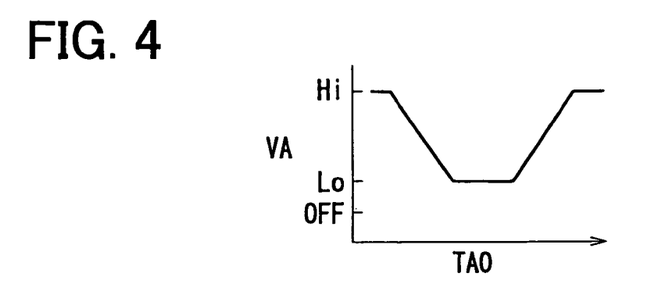
FIG. 4 is a characteristic graph showing a relation between a target blowout temperature TAO and a blower control voltage VA according to the first embodiment.

In step 340, a blower control voltage VA is determined by means of the predetermined characteristic graph (table) shown in FIG. 4 based on the target blowout temperature TAO, which is calculated in the step 330. In step 350, the suction mode, which is one of an outside air intake mode, an inside and outside air intake mode, and an inside air circulation mode, is determined based on the target blowout temperature TAO when manual air conditioner is not selected.

Figure 5:
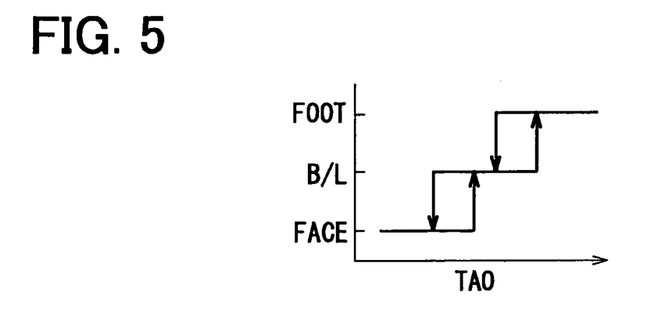
FIG. 5 is a characteristic graph showing a relation between the target blowout temperature TAO and a blowout port mode according to the first embodiment.

In step 360, the blowout port mode is determined by means of the predetermined characteristic graph (table) shown in FIG. 5 based on the target blowout temperature TAO, which is calculated in the step 330.

The rate of the air volume from each blowout port 12–15 is basically fixed to a certain value in response to the blowout port mode. The upper blowout port 15 functions as a complement to the FACE blowout port 12.

After the temperature in the vehicle compartment 4 is in a stable condition, the blowout air volume from the upper blowout port 15 is increased rather than from the FACE blowout ports 12. The stable condition is a condition that the temperature in the vehicle compartment 4 reaches around the set temperature. In such a situation, the blowout air is blown indirectly from the upper blowout port 15 toward the driver. As a result, the draft feeling is decreased.

Figure 6:
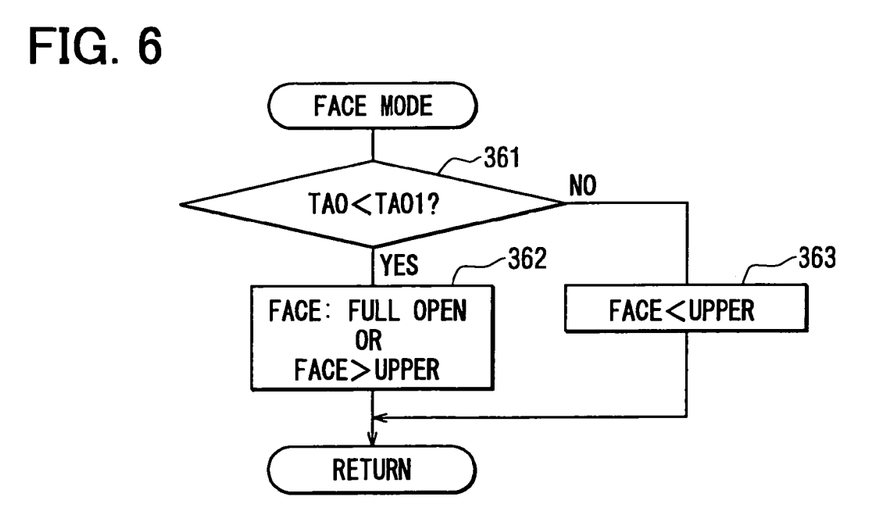
FIG. 6 is a flowchart showing a control of blowout ports during a face blowout mode according to the first embodiment.

Instead of a fixed value, the rate of the air volume from the FACE blowout port 12 and the upper blowout port 15 may be changed based on the target blowout temperature TAO as shown in FIG. 6. In this alternative embodiment, while the target blowout temperature TAO is lower than a first temperature TAO1 during a cooling mode, which is called a transitional period, the FACE blowout ports 12 are set to fully open (steps 361, 362). The first temperature TAO1 is a little lower than a temperature at the stable condition. Instead of being fully open, the air volume from the FACE blowout ports 12 may be set to a larger rate than the air volume from the upper blowout port 15. After that, when the target blowout temperature TAO is higher than the first temperature TAO1, which is called the stable condition, the air volume from the FACE blowout ports 12 is set to lower rate than the air volume from the upper blowout port 15 (steps 361, 363). As a result, the draft feeling can be prevented sooner.

In step 370 in FIG. 3, the air conditioning control unit 200 calculates a fogging control value for preventing the windshield 1 from fogging. In the embodiment, the windshield fogging tends to take place because the upper blowout port 15 is provided to prevent the draft feeling. Prior to the windshield fogging, at an appropriate timing, a possibility of the windshield fogging is previously and accurately determined by using estimated windshield temperature and dew point temperature. The estimated windshield temperature and the dew point temperature directly relate to a fogging phenomenon. The calculation in step 370 is discussed later in detail.

In step 380, a target A/M opening of the air mix door 26 is determined by means of the predetermined characteristic graph. The predetermined characteristic graph is determined based on the target blowout temperature TAO. In step 390, the air conditioning control unit 200 controls the air conditioning unit 100 based on the result in steps 340–380 so that the air in the vehicle compartment 4 can be controlled to the desired condition.

Next, the fogging preventable control for preventing the windshield fogging in step 370, which is a substantial part of the present invention, will be explained with reference to FIGS. 7–11.

Figure 7:
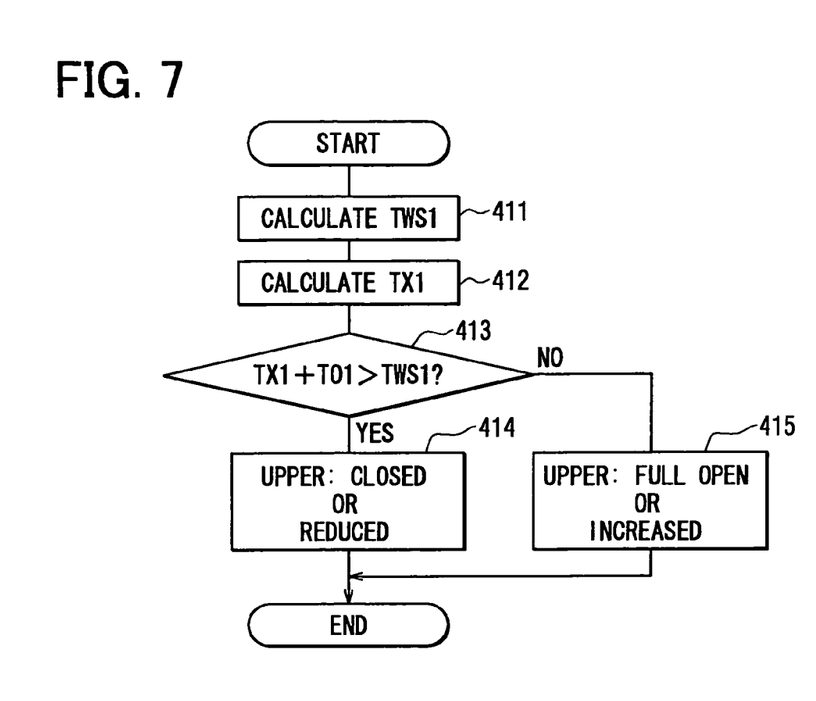
FIG. 7 is a flowchart showing a fogging preventable control for preventing a windshield from fogging in a cooling mode according to the first embodiment.

During the FACE mode and the cooling mode, a process shown in FIG. 7 is carried out. When an estimated outside windshield temperature TWS1 is lower than an outside dew point temperature TX1 in the FACE mode in the cooling mode, the windshield fogging tends to take place at an outside of the windshield 1. To prevent the windshield fogging in the appropriate timing, the possibility of the windshield fogging is previously and accurately determined. The FACE mode is selected in step 360 of FIG. 3 in a certain condition, such as the cooling mode in summer. The estimated outside windshield temperature TWS1 is an estimated temperature at an outside of the windshield 1. The outside dew point temperature TX1 is a temperature of the air outside of the vehicle compartment 4.

As shown in FIG. 7, in step 411, the estimated outside windshield temperature TWS1 is calculated based on the signals read in step 320 by a following equation (2). The equation (2) is an estimate equation for the outside windshield temperature.

$$TWS1 = TAM + KSPD1 \cdot V \cdot (KSS1 \cdot TS + KRR1 \cdot TR) - C1 \qquad (2)$$

In the equation (2), "TAM" is the outside air temperature detected by the outside air temperature sensor 62, and "V" is the speed of the vehicle detected by the vehicle speed sensor 66. "TS" is the quantities of solar radiation detected by the solar radiation sensor 63, and "TR" is the inside air temperature detected by the inside air temperature sensor 61. "KSPD1", "KSS1", "KRR1" are correction factors, and "C1" is a correction constant. Step 411 corresponds to outside windshield temperature estimate means.

In step 412, the outside dew point temperature TX1 is calculated based on the outside air humidity (relative humidity) and the outside air temperature TAM by a psychrometric chart. The outside air humidity and the outside air temperature are read in step 320.

Figure 8:
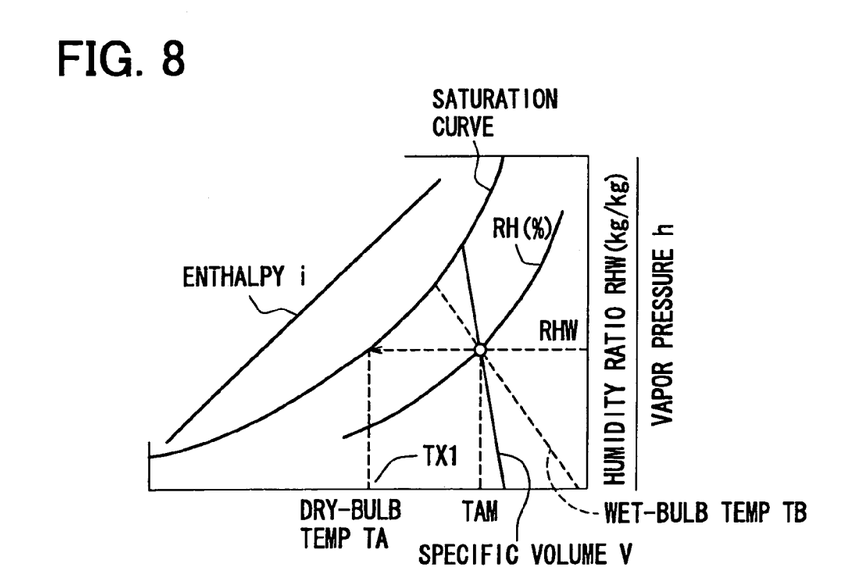
FIG. 8 shows a simplified diagram showing the psychrometric chart according to the first embodiment.

FIG. 8 shows a simplified diagram showing the psychrometric chart. The outside dew point temperature TX1 is determined by an intersection point of the saturation curve and the absolute humidity RHW when the absolute humidity RHW is constant when the outside air humidity (relative humidity RH) and the outside air temperature TAM are determined. Key characteristic values that are included in the psychrometric chart are stored in the memory 201 of the air conditioning control unit 200 in advance. Accordingly, the air conditioning control unit 200 can calculate the outside dew point temperature TX1. Step 412 corresponds to outside dew point temperature determination means.

Figure 9B:
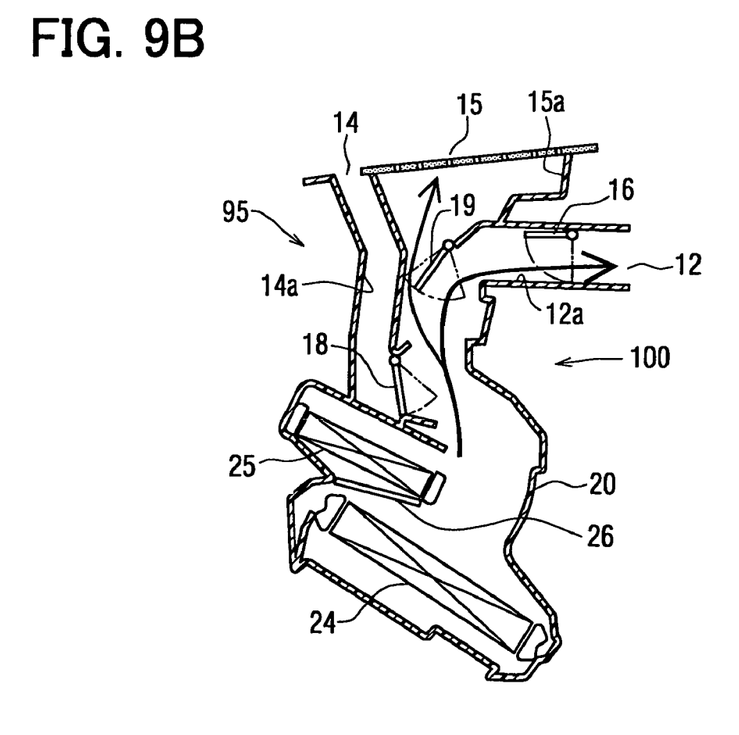

In step 413, it is determined whether the sum of the outside dew point temperature TX1 and an offset temperature TO1 is larger than the estimated outside windshield temperature TWS1. When the sum is larger than the estimated outside windshield temperature TWS1, the windshield fogging outside of the windshield 1 is expected with high possibility. In this situation, accordingly, the upper blowout port 15 is closed to stop blowing from the upper blowout port 15 in step 414. FIG. 9A shows this situation. Instead of closing the upper blowout port 15, the air volume from the upper blowout port 15 may be reduced to a certain volume to be able to prevent the windshield 1 from fogging. FIG. 9B shows this situation. In those situations, the air volume from the FACE blowout ports 12 is increased to compensate the reduced volume from the upper blowout port 15. FIGS. 9A, 9B show detailed structures of the air conditioning unit 100 shown in FIG. 1.

In step 413, when the sum of the outside dew point temperature TX1 and an offset temperature TO1 is not larger than the estimated outside windshield temperature TWS1, low possibility of the windshield fogging outside of the windshield 1 is expected. In this situation, the upper blowout port 15 is fully opened to maximize the air volume from the upper blowout port 15 in step 415. Instead of fully opening the upper blowout port 15, the air volume from the upper blowout port 15 may be increased. In this situation, the air volume from the FACE blowout ports 12 is reduced to compensate the increased volume from the upper blowout port 15. These steps maintain air conditioning performance and prevent the draft feeling of the driver and the passenger.

The offset temperature TO1 is a constant value for preventing the fogging of the windshield 1 in advance. For example, the offset temperature TO1 is set between 3–10K.

In the embodiment as shown in FIG. 7, the fogging preventable control is used during the FACE mode. The fogging preventable control may be applied to the DEF mode. For example, in the DEF mode, when the sum of the outside dew point temperature TX1 and an offset temperature TO1 is larger than the estimated outside windshield temperature TWS1, the DEF blowout port 14 is closed to stop blowing from the DEF blowout port 14. Instead of closing the DEF blowout port 14, the air volume from the DEF blowout port 14 may be reduced to prevent the windshield 1 from fogging.

Figure 10:
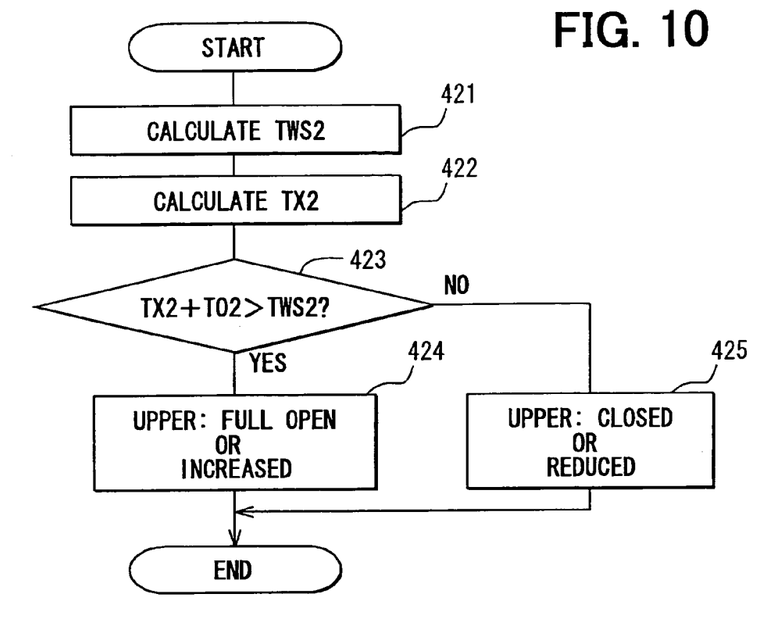
FIG. 10 is a flowchart showing a fogging preventable control for preventing the windshield from fogging in a heating mode according to the first embodiment.

On the other hand, during a FOOT mode and the heating mode, a process shown in FIG. 10 is carried out. When an estimated inside windshield temperature TWS2 is lower than an inside dew point temperature TX2 in the FOOT mode in the heating mode, for example in winter, the windshield fogging tends to take place at an inside of the windshield 2. To prevent the windshield fogging in the appropriate timing, the possibility of the windshield fogging is previously and accurately determined. The estimated inside windshield temperature TWS2 is an estimated temperature at an inside of the windshield 1. The inside dew point temperature TX2 is a temperature of the air inside of the vehicle compartment 4.

As shown in FIG. 10, in step 421, the estimated inside windshield temperature TWS2 is calculated based on the signals read in step 320 by a following equation (3). The equation (3) is an estimate equation for the inside windshield temperature.

$$TWS2 = TAM + KSPD2 \cdot V \cdot (KSS2 \cdot TS + KRR2 \cdot VR) - C2 \qquad (3)$$

In the equation (3), "TAM" is the outside air temperature detected by the outside air temperature sensor 62, and "V" is the speed of the vehicle detected by the vehicle speed sensor 66. "TS" is the quantities of solar radiation detected by the solar radiation sensor 63, and "TR" is the inside air temperature detected by the inside air temperature sensor 61. "KSPD2", "KSS2", "KRR2" are correction factors, and "C2" is a correction constant. Step 421 corresponds to inside windshield temperature estimate means In step 422, the inside dew point temperature TX2 is calculated based on the inside air humidity (relative humidity) and the inside air temperature TR by a psychrometric chart shown in FIG. 8. The inside air humidity and the inside air temperature are read in step 320. Step 422 corresponds to inside dew point temperature determination means.

Figure 11A:
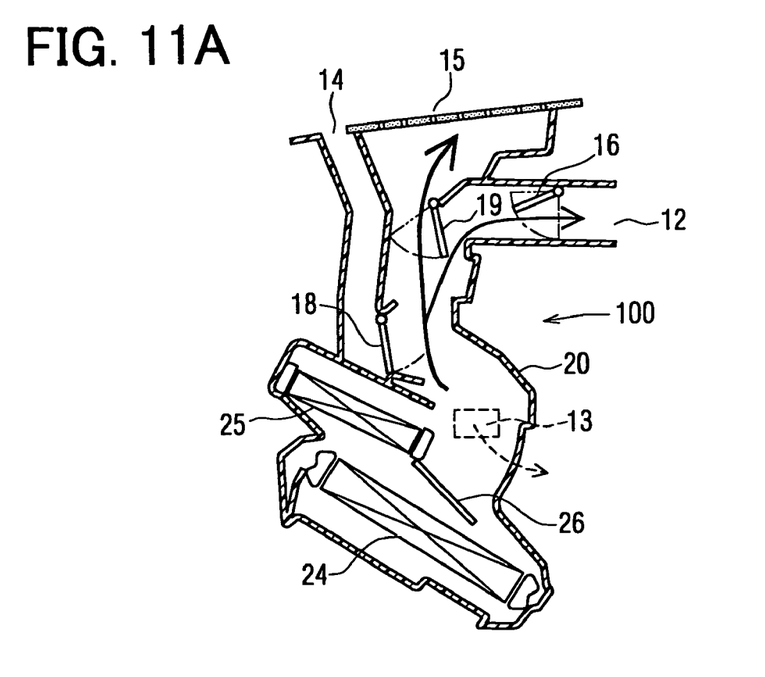
FIGS. 11A, 11B show detailed structures of a air conditioning unit with operated situations in response to the control of FIG. 10 according to the first embodiment.
Figure 11B:
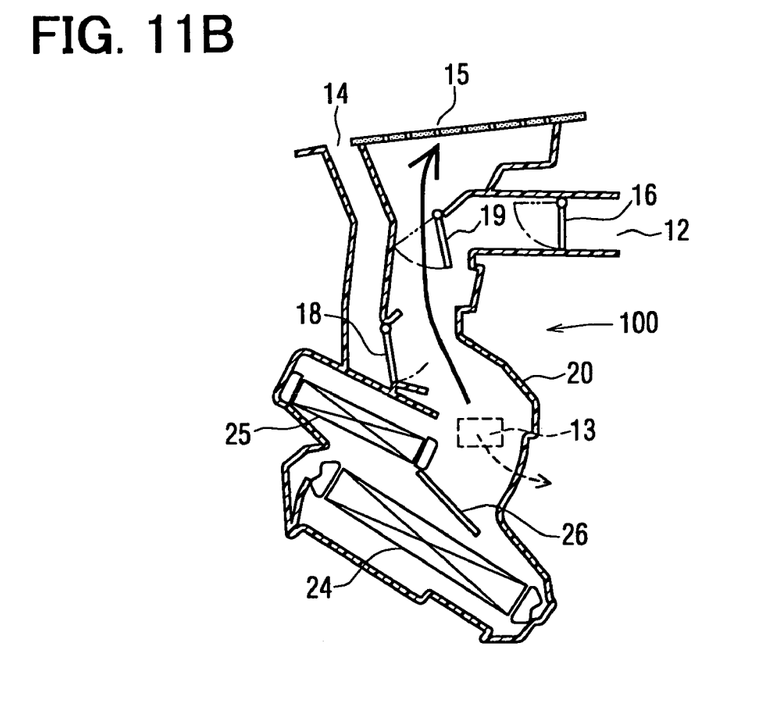

In step 423, it is determined whether the sum of the inside dew point temperature TX2 and an offset temperature TO2 is larger than the estimated inside windshield temperature TWS2. When the sum is larger than the estimated inside windshield temperature TWS2, the windshield fogging inside of the windshield 1 is expected with high possibility. In this situation, accordingly, the upper blowout port 15 is fully opened in step 424. FIG. 11B shows this situation. Instead of this, the air volume from the upper blowout port 15 may be increased to prevent the windshield 1 from fogging. This means that the FACE blowout ports 12 are opened as well as the upper blowout port 15 is fully opened. FIG. 11A shows this situation. These prevent the inside of the windshield 1 from fogging because of the warm air from the upper blowout port 15, and are able to blow the warm air to the driver and the passenger to maintain the comfortable feeling of them. FIGS. 11A, 11B show detailed structures of the air conditioning unit 100 shown in FIG. 1.

In step 423, when the sum of the inside dew point temperature TX2 and an offset temperature TO2 is not larger than the estimated inside windshield temperature TWS2, the windshield fogging inside of the windshield 1 is not expected with low possibility. In this situation, the upper blowout port 15 is fully closed to stop the blow from the upper blowout port 15 in step 425. Instead of fully closing the upper blowout port 15, the air volume from the upper blowout port 15 may be decreased to a certain volume. In these situations, the air volume from the FOOT blowout port 13 is increased to compensate the decreased volume from the upper blowout port 15 and the FACE blowout ports 12. These maintain warm feeling of the driver and the passenger.

The offset temperature TO2 is a constant value for preventing the fogging of the windshield 1 in advance. For example, the offset temperature TO2 is set between 3–10K.

[Second Embodiment]

Figure 12:
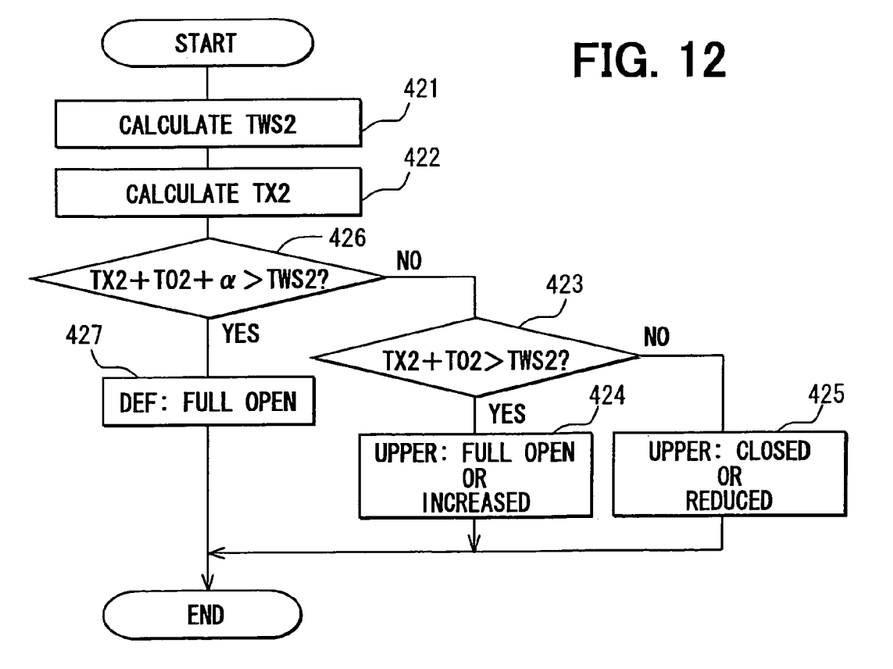
FIG. 12 shows a flowchart showing a fogging preventable control for preventing the windshield from fogging in a heating mode according to a second embodiment of the present invention.

FIG. 12 shows a second embodiment, which is used in the heating mode in winter to prevent the inside of the windshield 1 from fogging instead of the first embodiment shown in FIG. 10. The second embodiment shown in FIG. 12 has additional steps 426, 427 in compared with the first embodiment shown in FIG. 10.

In step 426, it is determined whether the estimated inside windshield temperature TWS2 is lower than the inside dew point temperature TX2 to a large degree. When the estimated inside windshield temperature TWS2 is lower than the inside dew point temperature TX2 to a large degree, the DEF blowout port 14 is fully opened to blow the warm conditioned air from the DEF blowout port 14 (step 427). As a result, the temperature of the windshield 1 is quickly increased. After that, while the air temperature inside the vehicle compartment 4 is increased but the estimated inside windshield temperature TWS2 is still lower than the sum of the inside dew point temperature TX2 and the offset temperature TO2 (step 424), the DEF blowout port 14 is closed and the upper blowout port 15 is fully opened (step 424). Instead of fully opening of the upper blowout port 15, the air volume from the upper blowout port 15 may be increased to a certain volume, in the same manner as the first embodiment.

Accordingly, when the windshield fogging inside of the windshield 1 is expected with high possibility, the windshield 1 is prevented from fogging because of the quick warming to the windshield 1. In addition, after that, the inside of the windshield 1 is continuously prevented from fogging and heating effect is maintained by using the upper blowout port 15.

In step 427, only the DEF blowout port 14 is fully opened. Instead of this embodiment, the upper blowout port 15 may be fully opened as well as the DEF blowout port 14 is fully opened. This can increase the blowout air to the windshield 1, so that the windshield 1 can be quickly warmed.

The present invention should not be limited to the embodiments discussed above and shown in the figures, but may be implemented in various ways without departing from the spirit of the invention.

For, example, in the foregoing embodiment, the vehicle air conditioner 150 has both fogging preventable controls in the cooling mode and the heating mode as shown in FIGS. 7, 10, respectively. However, the vehicle air conditioner 150 may have only one of the fogging preventable control.

What is claimed is:

1. A vehicle air conditioner comprising:
    an air conditioning unit that blows conditioned air through blowout ports, wherein the blowout ports have a face blowout port that blows the conditioned air toward a driver and a top blowout port that blows the conditioned air toward a windshield;
    a control unit that controls air volume of the conditioned air blown from the blowout ports based on heat load of a vehicle and controls a blowout port mode having at least a face blowout port mode;
    an outside dew point temperature determination means for determining an outside dew point temperature of outside air; and
    an outside windshield temperature estimate means for estimating an outside windshield temperature,
    wherein the control unit controls the air volume of the conditioned air blown from the face blowout port and the top blowout port based on the outside dew point temperature and the estimated outside windshield temperature during the face blowout port mode.

2. The vehicle air conditioner according to claim 1, wherein the top blowout port has a defroster blowout port that defrosts a windshield fogging and an upper blowout port that is disposed between the face blowout port and the defroster blowout port, the upper blowout port blows the conditioned air indirectly toward the driver, and
    the control unit controls the air volume of the conditioned air blown from the upper blowout port based on the outside dew point temperature and the estimated outside windshield temperature in the face blowout port mode.

3. The vehicle air conditioner according to claim 2, wherein the air conditioning unit has blowout port switching doors that control the air volume of the conditioned air from the face blowout port, the defroster blowout port, and the upper blowout port, and
    the control unit controls the blowout port switching doors to control the blowout port mode.

4. The vehicle air conditioner according to claim 1, wherein the conditioned air blown from the top blowout port is stopped or decreased when the estimated outside windshield temperature is lower than the outside dew point temperature during the face blowout port mode.

5. The vehicle air conditioner according to claim 1, wherein the conditioned air blown from the top blowout port is stopped or decreased when the estimated outside windshield temperature is lower than a sum of the outside dew point temperature and an offset temperature during the face blowout port mode.

6. The vehicle air conditioner according to claim 1, further comprising:
    an outside air humidity sensor that detects outside humidity of the outside air; and
    an outside air temperature sensor that detects an outside temperature of the outside air,
    wherein the outside dew point temperature determination means determine the outside dew point temperature based on the outside humidity and the outside temperature.

7. The vehicle air conditioner according to claim 1, further comprising:
    a solar radiation sensor that detects a quantity of solar radiation to a vehicle compartment;
    an inside air temperature sensor that detects an inside temperature of inside air in the vehicle compartment; and
    a vehicle speed sensor that detects a speed of the vehicle,
    wherein the outside windshield temperature estimate means estimate the outside windshield temperature based on the quantity of the solar radiation, the outside temperature, the inside temperature, and the speed of the vehicle.

8. The vehicle air conditioner according to claim 1, wherein the control unit controls that the conditioned air volume from the face blowout port is set to a larger rate than the conditioned air volume from the top blowout port during a transitional period toward a set temperature in the face blowout port mode, and the control unit controls that the conditioned air volume from the top blowout port is set to a larger rate than the conditioned air volume from the face blowout port during a stable condition in the face blowout port mode.

9. The vehicle air conditioner according to claim 1, further comprising:

an inside dew point temperature determination means for determining an inside dew point temperature of inside air; and an inside windshield temperature estimate means for estimating an inside windshield temperature, wherein the blowout ports have a foot blowout port that blows the conditioned air toward foot of a driver, the blowout port mode has a foot blowout port mode, and the control unit controls the air volume of the conditioned air blown from the foot blowout port and the top blowout port based on the inside dew point temperature of the inside air and the estimated inside windshield temperature during the foot blowout port mode.

* * * * *